(12) United States Patent
Tsai

(10) Patent No.: US 8,532,849 B1
(45) Date of Patent: Sep. 10, 2013

(54) SYSTEM, DEVICE, AND METHOD FOR PRESENTING COURSE DEVIATION INFORMATION ON AN AIRCRAFT DISPLAY UNIT

(75) Inventor: Hung-i B. Tsai, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 436 days.

(21) Appl. No.: 12/893,264

(22) Filed: Sep. 29, 2010

(51) Int. Cl.
G06F 19/00 (2011.01)

(52) U.S. Cl.
USPC ............................................. 701/17; 340/979

(58) Field of Classification Search
USPC ................... 701/1–18; 340/988, 992, 995.14, 340/979, 974, 438, 945, 963, 967, 973, 980, 340/947, 971; 715/202; 244/75.1, 180, 181, 244/183
See application file for complete search history.

(56) References Cited

U.S. PATENT DOCUMENTS

| | | | | |
|---|---|---|---|---|
| 5,801,659 A | * | 9/1998 | Helfrick | 342/357.4 |
| 7,782,229 B1 | | 8/2010 | Barber | |
| 7,834,779 B2 | * | 11/2010 | He et al. | 340/973 |
| 8,224,566 B2 | * | 7/2012 | Lyons | 701/408 |
| 2004/0189492 A1 | * | 9/2004 | Selk et al. | 340/973 |
| 2007/0188350 A1 | * | 8/2007 | He et al. | 340/979 |
| 2009/0207048 A1 | * | 8/2009 | He et al. | 340/973 |
| 2011/0301842 A1 | * | 12/2011 | Krupansky et al. | 701/206 |

* cited by examiner

Primary Examiner — Marthe Marc-Coleman
(74) Attorney, Agent, or Firm — Donna P. Suchy; Daniel M. Barbieri

(57) ABSTRACT

A present novel and non-trivial system, device, and method for presenting course deviation information on an aircraft display unit are disclosed. Lateral/vertical boundaries are established based upon lateral/vertical navigation data provided by one or more navigation data sources. Lateral/vertical deviation symbology data set(s) representative of lateral/vertical deviation scale(s) are generated and adapted to the lateral/vertical navigation data. The adapted lateral/vertical deviation symbology data set(s) representative of adapted lateral/vertical deviation scale(s) are provided to a display unit, whereby symbology(ies) of such adapted scale(s) are presented on a screen of the display unit. Each adapted scale is comprised of a desired course indicator and at least one deviation indicator, where the desired course indicator corresponds to a desired course and each deviation indicator corresponds to one navigation boundary. In response to changes of aircraft deviation, all indicators move together in unison within their respective, adapted deviation scale.

23 Claims, 16 Drawing Sheets

| Lateral Deviations | | | | |
|---|---|---|---|---|
| Deviation<br>Location | 0.5 Dot<br>(0.625°) | 1 Dot<br>(1.25°) | 1.5 Dots<br>(1.875°) | 2 Dots<br>(2.5°) |
| Threshold | 87.50 ft | 175.00 ft | 262.50 ft | 350.00 ft |
| 7 NM | 551.75 ft | 1103.50 ft | 1655.25 ft | 2207.00 ft |

| Vertical Deviations | | | | |
|---|---|---|---|---|
| Deviation / Location | 0.5 Dot (0.175°) | 1 Dot (0.35°) | 1.5 Dot (0.525°) | 2 Dot (0.7°) |
| Threshold | 3.06 ft | 6.11 ft | 9.17 ft | 12.22 ft |
| 7 NM | 132.97 ft | 265.94 ft | 398.91 ft | 531.88 ft |

SYSTEM, DEVICE, AND METHOD FOR PRESENTING COURSE DEVIATION INFORMATION ON AN AIRCRAFT DISPLAY UNIT

BACKGROUND OF THE INVENTION

1. Field of the Invention

This invention pertains generally to the field of aircraft display units that provide information to the pilot or flight crew of an aircraft.

2. Description of the Related Art

Prior to the advent of electronic displays, analog instruments were developed to provide the pilot with an indication of whether the aircraft was on the desired course. One of these instruments is a course deviation indicator comprised of, in part, "needles" and "dots" for providing the pilot with course information. If the aircraft is on the desired course, the needle would be centered; if not, the needle would deflect in the direction of the desired course, and the numbers of dots over which the needle traversed provided the pilot with a scale from which he or she can judge the amount of the deviation.

For lateral navigation, if the needle deflected to the left, the aircraft is located to the right of the desired course, and the pilot has to correct by steering to the left—towards the needle—to capture the desired course; if the needle deflected to the right, the pilot has to correct by steering to the right and towards the needle. For vertical navigation, if the needle deflected upward, the aircraft is below the desired course (i.e., glide slope), and the pilot has to correct by steering up to capture the glide slope; if the needle deflected downward, the pilot has to correct by steering down to capture the glide slope. If the amount of deviation is one dot from center, the amount of correction is less than if the amount of deviation is two dots from center; likewise, if the amount of deviation is two dots from center, the amount of correction is less than if the amount of deviation is three dots from center.

When flying an aircraft in instrument metrological conditions, that is in a condition when visual references outside of the aircraft are not available (e.g., flying an approach to a runway in low visibility conditions), staying "on the needles" is important. To accomplish this task, however, the pilot must continuously shift his vision between the two needles. Moreover, because the instrument is a separate instrument from the artificial horizon, the pilot must continuously adjust his scan between multiple instruments.

With the development of electronic display units and the ability to establish multiple configurations in one instrument, display units such as electronic primary flight directors can be configured to display both the artificial horizon and course deviation information on the same screen, thereby reducing the scan area of the pilot; however, there is still a requirement of the pilot to process deviation information from two separate scales, where one scale is indicative of lateral deviation and the other of vertical deviation.

BRIEF SUMMARY OF THE INVENTION

The embodiments disclosed herein present at least one novel and non-trivial system, device, and method for presenting course deviation ("CD") information on an aircraft display unit.

In one embodiment, a system is disclosed for presenting CD information on an aircraft display unit, where such system may be comprised of one or more sources of navigation data, a symbology generator ("SG"), and a display unit. The navigation data could be an instrument landing system ("ILS") system data provided by an ILS system, a VHF omnidirectional range ("VOR") system data provided by a VOR system, and/or navigation data representative of a desired lateral/vertical course, a waypoint location, and an aircraft location that has been provided by a navigation system. The SG may be configured or programmed to perform the method discussed below for transforming lateral/vertical navigation data into an adapted lateral/vertical deviation symbology data set(s), whereby a properly-configured display unit may received such symbology data set(s) and present CD information symbology representative of a desired lateral/vertical course indicator and at least one lateral/vertical deviation indicator, where each indicator moves in unison with the other(s) in response to changes of their respective deviations.

In another embodiment, a device is disclosed for presenting CD information on an aircraft display unit, where such device may be comprised of the SG, an input communications interface to facilitate the communications of data between the navigation data source(s) and the SG, and an output communications interface to facilitate the communications of data between the SG and the display unit. The SG may be configured or programmed to perform the method discussed below for transforming lateral/vertical navigation data into an adapted lateral/vertical deviation symbology data set(s).

In another embodiment, a method is disclosed for presenting CD information on an aircraft display unit, where such method may be performed by the SG. When configured or programmed with the disclosed method, the SG may receive lateral/vertical navigation data, establish a plurality of lateral/vertical desired course boundaries based upon the navigation data, generate lateral/vertical deviation symbology data set(s) representative of lateral/vertical course deviation scale(s), derive lateral/vertical deviation data representative of lateral/vertical course deviation from the lateral/vertical navigation data, adapt the lateral/vertical deviation symbology data set(s) to the lateral/vertical deviation data, and provide the adapted lateral/vertical deviation symbology data set(s) to the display unit. The lateral/vertical course deviation scale(s) could be comprised of a desired lateral/vertical course indicator and at least one lateral/vertical deviation indicator, where the desired lateral/vertical course indicator corresponds to a desired lateral/vertical course and each lateral/vertical deviation indicator corresponds to one lateral/vertical navigation boundary.

If the lateral/vertical navigation data is ILS system data, then lateral/vertical course deviation may be derived from localizer/glide slope deviation found in the ILS system data. If the lateral/vertical navigation data is VOR system data, then lateral/vertical course deviation may be derived from a selected course and a VOR omnibearing found in the VOR system data. If the lateral/vertical navigation data is navigation system data, then lateral/vertical course deviation may be derived as a function of the lateral/vertical desired course, a waypoint location, and an aircraft location.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
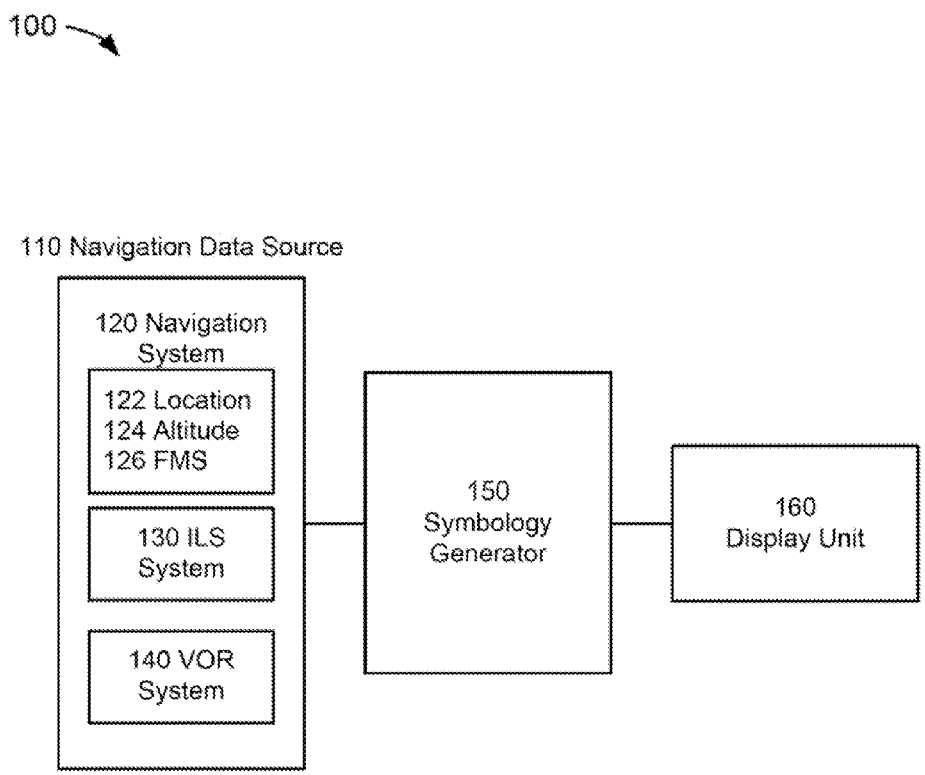
FIG. 1 depicts a block diagram of a course deviation ("CD") information presentation system.

FIG. 1 depicts a block diagram of a course deviation ("CD") information presentation system 100 suitable for implementation of the techniques described herein. Such presentation system 100 of an embodiment of FIG. 1 includes a navigation data source 110 comprised of a navigation system 120, an instrument landing system ("ILS") system 130, a VHF omnidirectional range ("VOR") system 140, a symbology generator ("SG") 150, and a display unit 160.

In an embodiment of FIG. 1, the navigation data source 110 comprises the system or systems that could provide navigation data information in an aircraft. It should be noted that data, as embodied herein for any source or system in an aircraft including a navigation system, could be comprised of any analog or digital signal, either discrete or continuous, which could contain information. As embodied herein, data and signals are treated synonymously. Aircraft could mean any vehicle which is able to fly through the air or atmosphere including, but not limited to, lighter than air vehicles and heavier than air vehicles, wherein the latter may include fixed-wing and rotary-wing vehicles.

The navigation system 120 may include, but is not limited to, an air/data system, an attitude heading reference system, an inertial guidance system (or inertial reference system), a global navigation satellite system ("GNSS") (or satellite navigation system), and/or a flight management computing system, all of which are known to those skilled in the art. For the purposes of the embodiments herein, a radio altimeter system may be included in the navigation system 120; a radio altimeter system is known to those skilled in the art for determining the altitude above the surface over which the aircraft is currently operating. As embodied herein, the navigation system 120 could be a source for providing navigation data including, but not limited to, aircraft location 122 (e.g., latitude and longitude coordinates) and/or altitude 124.

The navigation system 120 could include a flight management system ("FMS") 126 for performing a variety of functions performed to help the crew in the management of the flight; these functions are known to those skilled in the art. These functions could include receiving a flight plan and constructing both lateral and vertical flight plans from the flight plan. A pilot or flight crew may initialize the FMS 126 including, but not limited to, the selection of a flight plan, where such flight plan could provide the basis for all computations and displays. The pilot could create a flight plan from waypoints stored in a database or select a flight plan stored in a database of the FMS 126. The flight plan may be composed of various lateral and vertical elements that may be defined during initialization, and may be defined from navigation data stored in an FMS database. Data representative of waypoints could include, but is not limited to, location information and/or elevation information.

In a lateral flight plan, the FMS 126 could perform many functions including, but not limited to, navigational computations, radio navigation aids selections, and providing lateral flight information which could maintain the aircraft along the flight plan from takeoff to landing. Such lateral flight information could include, but is not limited to, a desired lateral course to the next waypoint of the lateral flight plan.

In a vertical flight plan, the FMS 126 could compute an optimum speed at each waypoint, other characteristic speeds, and the aircraft weight and center of gravity. Then, it could compute predictions along the flight plan based on these speeds and weight for the purpose of, for example, minimizing fuel consumption. It could also provide vertical flight information in reference to such predictions. Such vertical flight information could include, but is not limited to, a desired vertical course to the next waypoint of the vertical flight plan.

Lateral elements of a flight plan could include origin airport and runway; a departure procedure ("DP") that may include, but is not limited to, a standard instrument departure ("SID"); an enroute transition; enroute airways and waypoints; an arrival procedure that may include, but is not limited to, an enroute transition, a standard terminal arrival route ("STAR") procedure, a STAR-approach transition, an approach procedure, a missed approach procedure, and a holding procedure; and a flight plan to an alternate airport. Such procedures may be defined by various legs and waypoints between legs. Vertical elements could include a takeoff altitude which may include, but is not limited to, a thrust reduction and/or acceleration altitude; altitude constraints at one or more waypoints located along the flight path; vertical speed and/or flight path angle constraints at one or more waypoints located along the flight plan; speed constraints at one or more waypoints along the flight plan; climb and descent speed limits; climb and descent step legs; and cruise flight levels. As embodied herein, the navigation system 120 may be a source for providing navigation data to the SG 150 for subsequent processing as discussed herein.

In an embodiment of FIG. 1, the ILS system 130 is a system known to those skilled in the art for measuring the angular deviation between an aircraft and a desired course to a runway and a desired glide slope, where the desired course to the runway may coincide with a runway alignment axis. The ILS system 130 could be comprised of a receiver linked to a localizer antenna and a glide slope antenna. The ILS system 130 could be configured for receiving and demodulating localizer and glide slope signals propagated by ground-based localizer and glide slope transmitters. After the signals have been demodulated, ILS system data representative of, in part, angular localizer and glide slope deviation information may be generated by the ILS system 130 and provided to the SG 150.

In an embodiment of FIG. 1, the VOR system 140 is a system known to those skilled in the art for measuring angular deviation between an aircraft's flight path and a desired course to or from a ground-based VOR station. The VOR system 140 could be comprised of a receiver linked to an antenna. The VOR system 140 could be configured for receiving reference phase and variable phase signals propagated by a ground-based transmitter and comparing the phase relationship between the signals so that a VOR omnibearing may be determined. Then, VOR system data representative of, in part, desired course information (received through a manual and/or automatic omnibearing selection) and VOR omnibearing information and may be generated by the VOR system 140 and provided to the SG 150.

In an embodiment of FIG. 1, the SG 150 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The SG 150 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, the SG 150 could be a processor(s) used by or in conjunction with any other system of the aircraft including, but not limited to, a processor(s) associated with the navigation system 120, the ILS system 130, the VOR system 140, and/or the display unit 160 which could include a vision system such as, but not limited to, a synthetic vision system ("SVS"), an enhanced vision system ("EVS"), a combined SVS-EVS, or any combination thereof; for example, the SG 150 in FIG. 1, although depicted separately, the SG 140 could be included or made part of the display unit 160.

The SG 150 may be programmed or configured to receive as input data representative of information obtained from various systems and/or sources including, but not limited to, the navigation system 120, the ILS system 130, and/or the VOR system 140. As embodied herein, the terms "programmed" and "configured" are synonymous. The SG 150 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The SG 150 may be programmed or configured to execute the method discussed in detail below. The SG 150 may be programmed or configured to provide output data to various systems and/or units including, but not limited to, the display unit 160. The SG 150 may be electronically coupled to the display unit 160 to facilitate the providing of output data.

In an embodiment of FIG. 1, the display unit 160 could include any unit that provides symbology of tactical flight information. As embodied herein, tactical flight information could be information relevant to the instant or immediate control of the aircraft, whether the aircraft is in flight or on the ground. The display unit 160 may include, but are not limited to, a head-down ("HDD") unit and head-up ("HUD") unit. It should be noted that the remaining discussion herein will be drawn to the HDD unit; however, the embodiments disclosed herein are not limited to the HDD unit only but are equally applicable to the HUD unit and any other unit configured to display tactical flight information.

The display unit 160 provides tactical information to the pilot or flight crew, in the pilot's forward field of view through the windshield, eliminating transitions between head-down and head-up flying. The display unit 160 could display the same information found on a primary flight display ("PFD"), such as "basic T" information (i.e., airspeed, attitude, altitude, and heading). The display unit 160 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The display unit 160 is designed to provide flexible configurations which may be tailored to a desired configuration specified by a manufacturer and/or end-user of the aircraft.

Figure 2A:
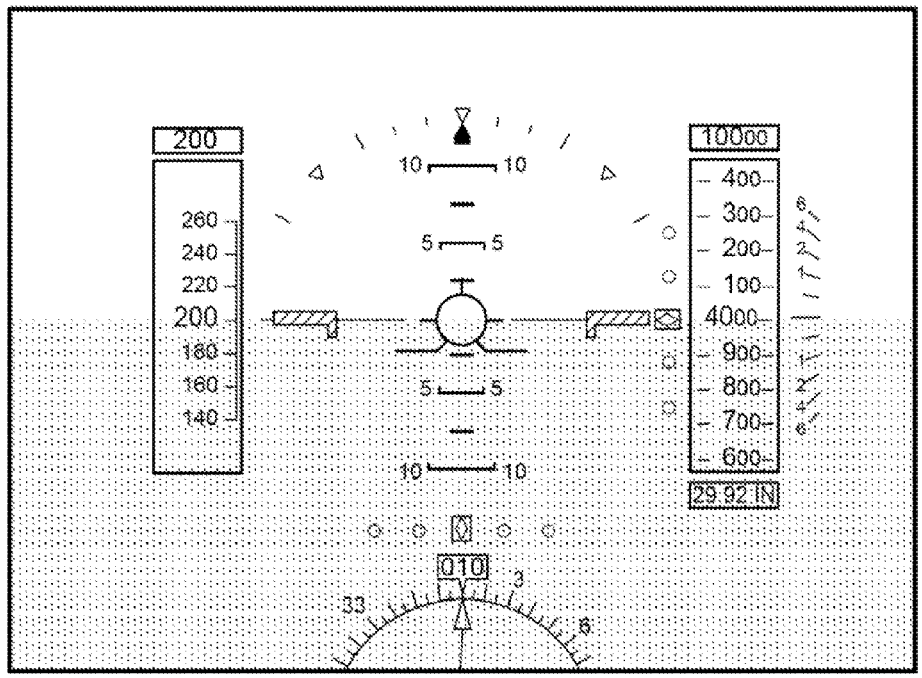
FIG. 2A depicts an exemplary illustration of symbology presented on an aircraft display unit.

The advantages and benefits of the embodiments discussed herein may be illustrated by showing how lateral and vertical course deviation information may be presented on the display unit 160 configured to display tactical flight information. FIG. 2A provides an exemplary illustration of the display unit 160 depicting a "blue/brown" electronic attitude indicator used in classic electronic PFDs. It should be noted that, although the remaining discussion herein will be drawn to the display unit 160 presenting a classical two-dimensional image of an electronic flight indicator, the course deviation symbology disclosed herein is equally applicable to the display unit 160 presenting a three-dimensional perspective synthetic scene, enhanced scene, or combined synthetic-enhanced scene outside the aircraft generated by an SVS, an EVS, or a combined SVS-EVS, respectively.

Figure 2B:
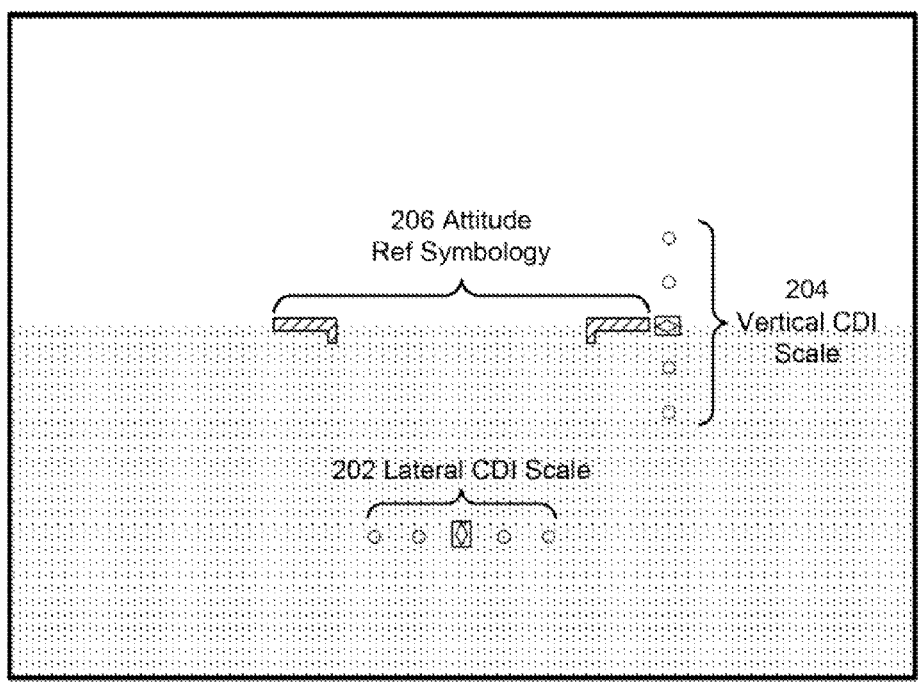
FIG. 2B depicts exemplary illustration of symbology indicative of a lateral course deviation indicator ("CDI") scale and a vertical CDI scale.

As indicated in FIG. 2B, the symbologies of a lateral course deviation indicator ("CDI") scale 202, a vertical CDI scale 204, and an aircraft attitude reference symbology 206 have been isolated from the other flight symbologies shown in FIG. 2A. The lateral CDI scale 202 is shown as a lateral arrangement comprised of a rectangle and a scale, where such scale is comprised of a diamond and four "dots" (illustrated as four hollow circles). The rectangle represents the desired lateral course, the diamond represents the reference point from which lateral deviation can be measured, and the dots indicate directional and numerical measurements of lateral deviation between the desired lateral course and the current aircraft position. When viewed by the pilot, the rectangle moves along the stationary scale in response to the aircraft's measured change in deviation from the desired course.

Similarly, the vertical CDI scale 204 is shown as a vertical arrangement comprised of a rectangle and a scale, where such scale is comprised of a diamond and four dots. The rectangle represents the desired vertical course, the diamond represents the reference point from which vertical deviation can be measured, and the dots indicate directional and numerical measurements of vertical deviation between the desired vertical course and the current aircraft position. When viewed by the pilot, the rectangle moves along the stationary scale in response to the aircraft's measured change in deviation from the desired course.

The rectangle of the lateral CDI scale 202 provides the pilot with the directional measurement of lateral deviation by moving left or right of the diamond in response to changes in deviation, and the rectangle of the vertical CDI scale 204 provides the pilot with the directional measurement of vertical deviation by moving up or down of the diamond in response to changes in vertical deviation. Those skilled in the art recognize the rectangles as providing the same functionality as CDI needles integrated in many classic analog indicators, where the needles swung or moved across the dots.

As shown, the rectangle and diamond of each scale coincide with one another, thereby indicating to the pilot that the aircraft is on course laterally and vertically; in other words, there is no lateral or vertical deviation from the desired courses. If there is deviation, the rectangle and diamond will not coincide with one another. If the aircraft is right of the desired lateral course, the rectangle will be located to the left of the diamond on the lateral CDI scale; if the aircraft is left of the desired lateral course the rectangle will be located to the right of the diamond. Similarly, if the aircraft is above the desired vertical course, the rectangle will be located below the diamond on the vertical CDI scale; if the aircraft is below the desired lateral course, the rectangle will be located above the diamond.

In addition to directional measurements, the dots provide the pilot with the ability to numerically measure the aircraft's deviation from the desired course. Each dot corresponds to the measurement between the desired course and a defined navigation boundary of the desired course; it should be noted that the dots do not represent the boundaries. For the purpose of illustration only and not of limitation, the dimensions of an exemplar ILS illustrated in the drawings of FIG. 3 will be used to define navigation boundaries of the desired course.

Figure 3A:
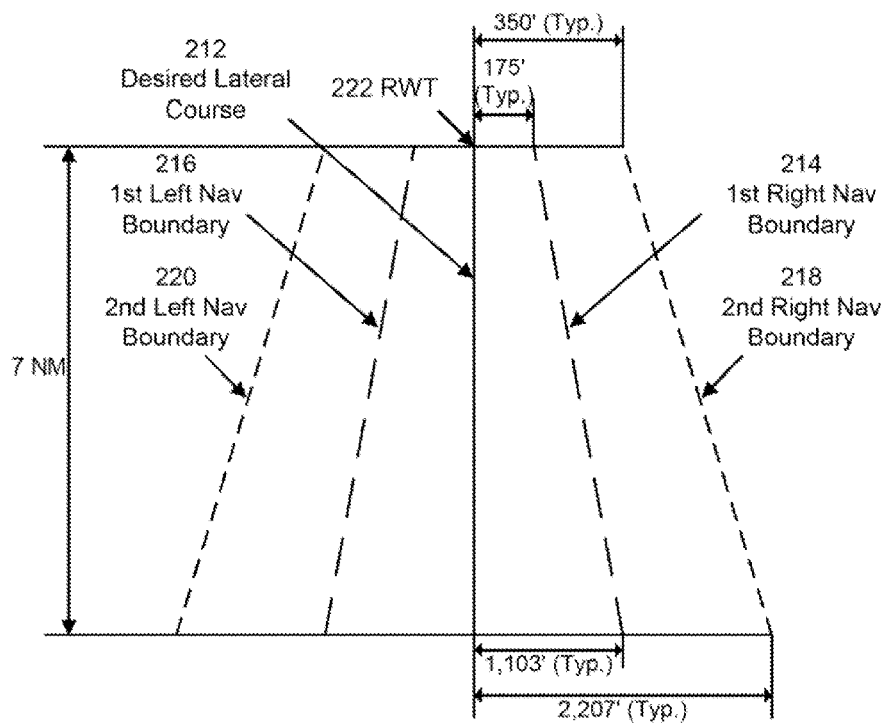
FIG. 3A depicts the dimensions of exemplary, convergent lateral boundaries of an instrument landing system.

As illustrated in FIG. 3A, the first dot to the left or right of the diamond shown on the lateral CDI scale 202 indicates the measurement between the desired lateral course 212 and a first right navigation boundary 214 or a first left navigation boundary 216, respectively, where each boundary corresponds to a 1.25 degree deviation from the desired lateral course 212. The second dot to the left or right of the diamond indicates the measurement between the desired lateral course 212 and a second right navigation boundary 218 or a second left navigation boundary 220, respectively, where each boundary corresponds to a 2.5 degrees deviation from the desired lateral course 212.

Because the lateral boundaries are typically comprised of straight lines in an ILS, the amount of variation is linearly proportional and may be determined from any fixed reference point which is assumed for FIG. 3A to be a runway threshold ("RWT") 222 of a runway (not shown). At the RWT 222, the first and second dots on each side of the diamond on the lateral CDI scale 202 indicate measured deviations of 175 feet and 350 feet, respectively. At a distance of 7 nautical miles ("NM") from the RWT 222, the first and second dots on each side of the diamond indicate measured deviations of approximately 1,103 feet and 2,207 feet, respectively.

Figure 3B:
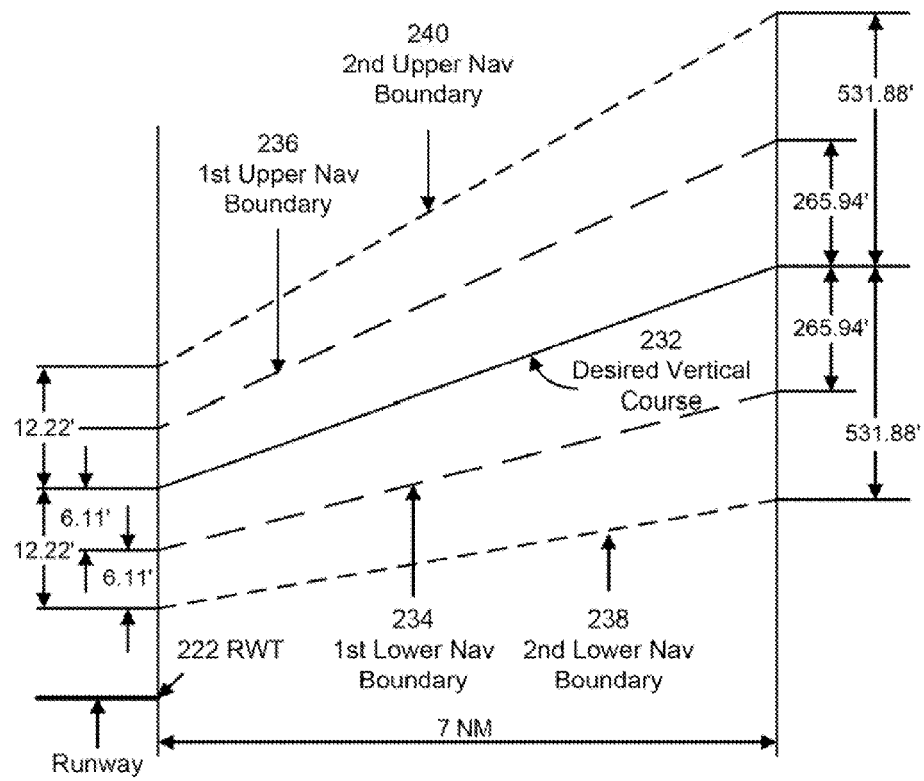
FIG. 3B depicts the dimensions of exemplary, convergent vertical boundaries of an instrument landing system.

Similarly, as illustrated in FIG. 3B, the first dot above or below the diamond shown on the vertical CDI scale 204 indicates the measurement between the desired vertical course 232 and a first lower navigation boundary 234 or a first upper navigation boundary 236, respectively, where each boundary corresponds to a 0.35 degree deviation from the desired vertical course 232. The second dot above or below the diamond indicates the measurement between the desired vertical course 232 and a second lower navigation boundary 238 or a second higher navigation boundary 240, respectively, where each boundary corresponds to a 0.70 degree deviation from the desired vertical course 232.

Because the vertical boundaries are typically comprised of straight lines in an ILS, the amount of variation is linearly proportional and may be determined from any fixed reference point which has been assumed to be the RWT 222 of the runway. At the RWT 222, the first and second dots on each side of the diamond on the vertical CDI scale 204 indicate measured deviations of approximately 6.11 feet and 12.22 feet, respectively. At a distance of 7 NM from the RWT 222, the first and second dots on each side of the diamond indicate measured deviations of approximately 265.94 feet and 531.88 feet, respectively.

Figure 4A:
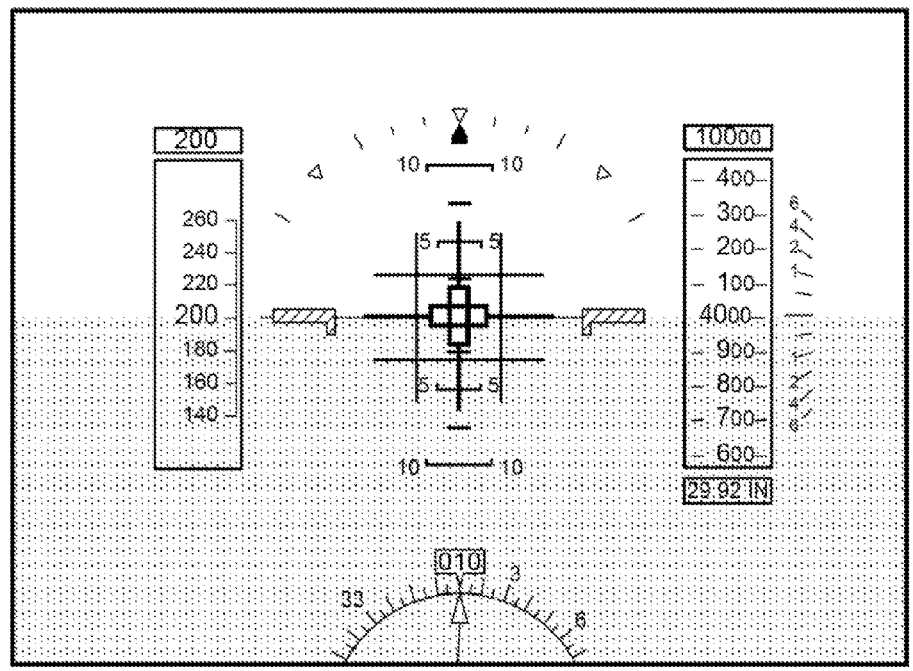
FIG. 4A illustrates the presentation of CDI symbology and flight symbologies on a display unit.

The drawings of FIG. 4 illustrate the presentation of CDI symbology as embodied and disclosed herein. FIG. 4A provides the exemplary illustration of the HDD unit of FIG. 3A with flight symbology depicted against the background of a three-dimensional perspective scene outside the aircraft. In addition, FIG. 4A illustrates the HDD unit of FIG. 3A presenting the disclosed CDI symbology. As shown in FIG. 4A, the CDI symbology is laterally and vertically centered on the aircraft attitude reference symbology.

Figure 4B:
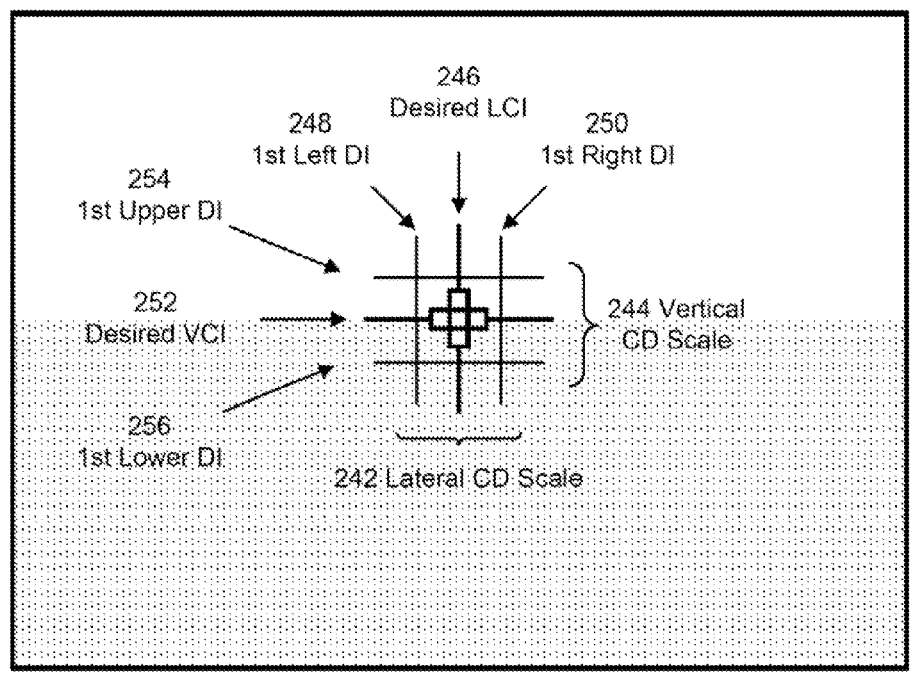
FIG. 4B illustrates the presentation of CDI symbology isolated from flight symbologies on a display unit.

As shown in FIG. 4B, the disclosed CDI symbology has been isolated from the other flight symbologies shown in FIG. 4A. As indicated in FIG. 4B, the course deviation ("CD") scale symbology may be comprised of a lateral CD scale 242 and/or a vertical CD scale 244. The lateral CD scale 242 is comprised of a plurality of laterally-disposed indicators: a desired lateral course indicator ("LCI") 246, a first left deviation indicator ("DI") 248 representative of or corresponding to a first left navigation boundary, and a first right DI 250 representative of or corresponding to a first right navigation boundary. The vertical CD scale 244 is comprised of a plurality of vertically-disposed indicators: a desired vertical course indicator ("VCI") 252, a first upper DI 254 representative of or corresponding to a first upper navigation boundary, and a first lower DI 256 representative of or corresponding to a first lower navigation boundary.

As shown, the desired LCI 246 and the desired VCI 252 have been illustrated as two lines and a rectangle. It should be noted that the desired LCI 246 and the desired VCI 252 have been illustrated with such visual appearance to exemplify their conspicuousness when viewed with the other course indicators; the presentation of the desired LCI 246 and the desired VCI 252 are not limited to such form. As embodied herein, the desired LCI 246 and desired VCI 252 may be comprised of any shape, size, and/or form suitable for the purpose of providing the pilot desired course information so long as the visual appearance of each are noticeably different and distinguishable by the pilot when he or she views them with the other course indicators.

The advantages and benefits of the embodiments disclosed herein may be illustrated in the drawings of FIG. 5 by showing examples of how the lateral CD scale symbology 242 of FIG. 4B responds to aircraft deviations within navigation boundaries of a desired lateral course. For the purpose of illustration and not of limitation, the desired lateral course and the navigation boundaries shown in FIG. 3A will be used in the drawings of FIG. 5.

Figure 5A:
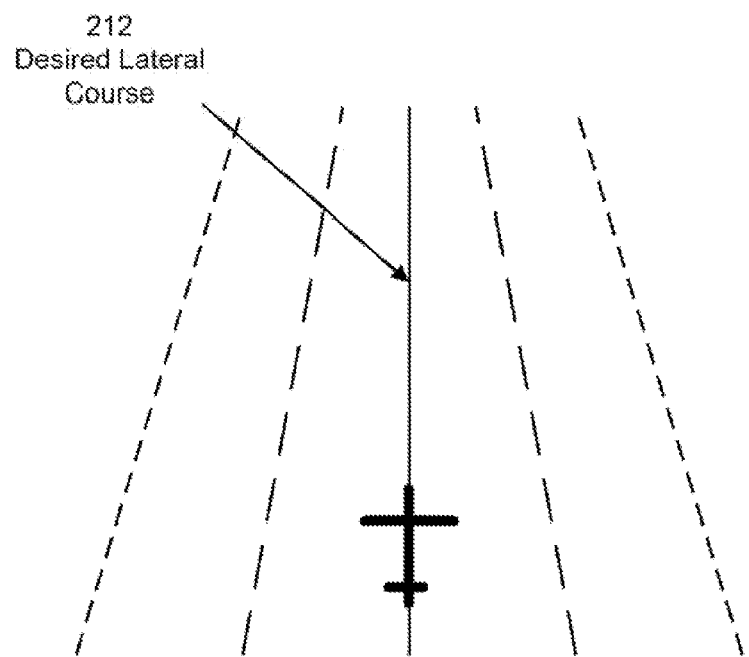
FIG. 5A provides an exemplary illustration of an aircraft located on a desired lateral course.
Figure 5B:
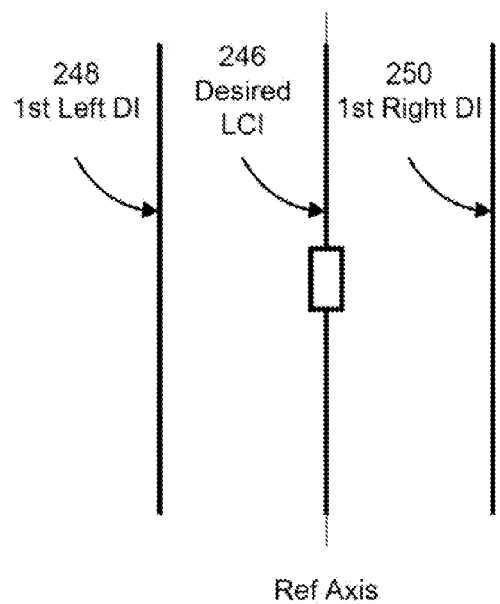
FIG. 5B provides an exemplary indication of a lateral CD scale for the aircraft of FIG. 5A.

Referring to FIG. 5A, an aircraft is located on the desired lateral course 212. In response to this information, the lateral CD scale 242 shown in FIG. 5B may be presented to the pilot. Here, the desired LCI 246 coincides with a reference axis to indicate no lateral course deviation, where such reference axis is representative of a stationary lateral reference. As embodied herein, the stationary lateral reference (which need not be an axis) could be configured so that it coincides with the lateral center of the aircraft attitude reference symbology when both are presented in an image on the display unit; the stationary lateral reference, however, need not be visible to the pilot.

Figure 5C:
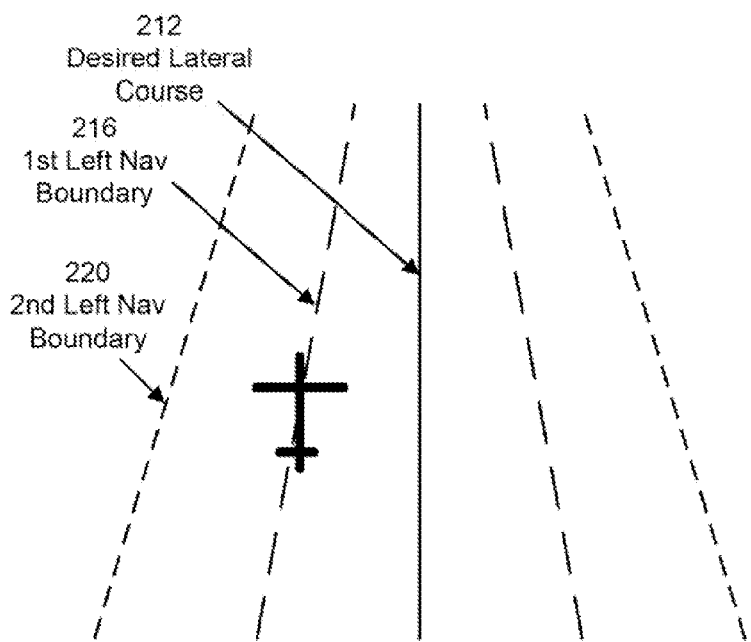
FIG. 5C provides an exemplary illustration of an aircraft located to the left of a desired lateral course.
Figure 5D:
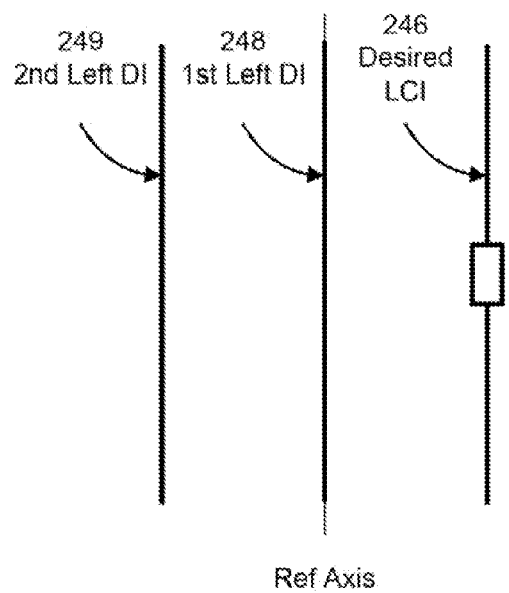
FIG. 5D provides an exemplary indication of a lateral CD scale for the aircraft of FIG. 5C.

Referring to FIG. 5C, assume that the aircraftshown in FIG. 5A has deviated left of the desired lateral course 212 and is now is located on the first left navigation boundary. In response to this information, the lateral CD scale 242 shown in FIG. 5D may be presented to the pilot. While the aircraft was deviating from the desired lateral course 212 to the left, the desired LCI 246 moved off the reference axis and to the right. Also, the first left DI 248 moved to the right and now coincides with the reference axis because the aircraft's location coincides with the first left navigation boundary 216. Also, the first right DI 250 moved "off of the scale" and was replaced with a second left DI 249 corresponding to the second left navigation boundary 220.

Figure 5E:
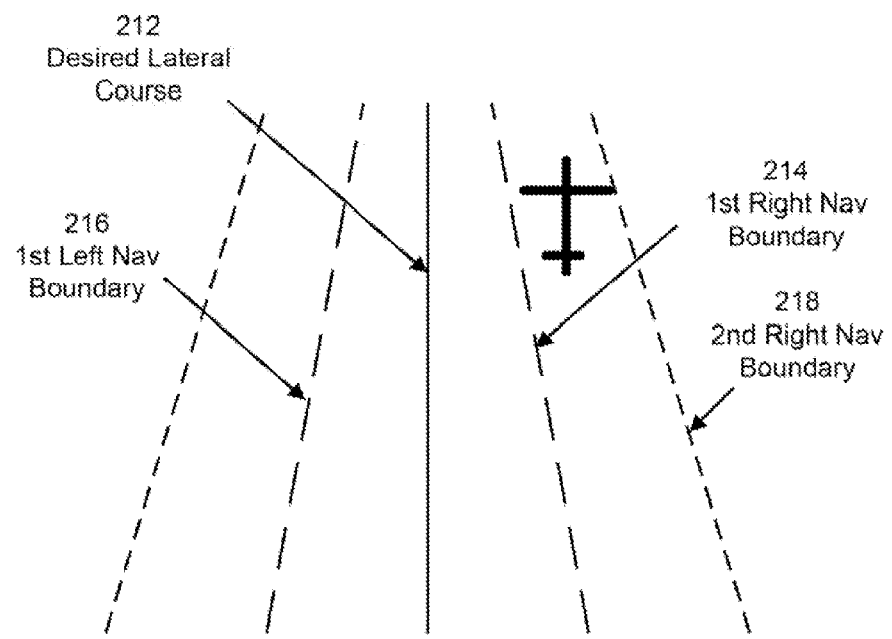
FIG. 5E provides an exemplary illustration of an aircraft located to the right of a desired lateral course.
Figure 5F:
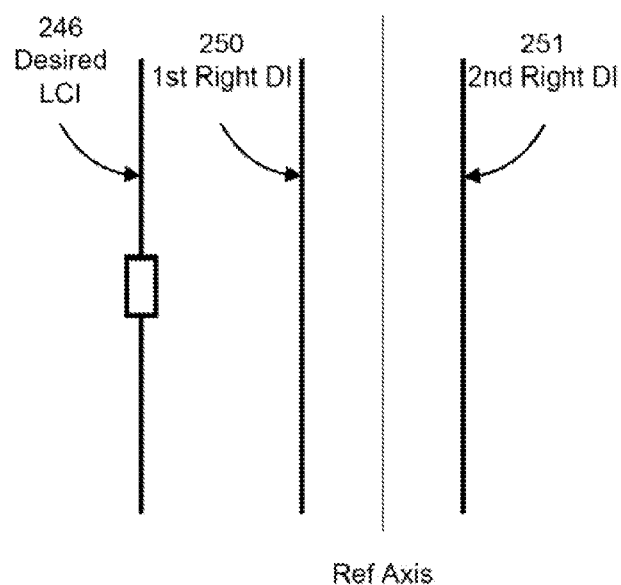
FIG. 5F provides an exemplary indication of a lateral CD scale for the aircraft of FIG. 5E.

Referring to FIG. 5E, assume that the aircraft shown in FIG. 5C has deviated right from the first left navigation boundary and the desired lateral course 212 and is now located between the first right navigation boundary 214 and the second right navigation boundary 218. In response to this information, the lateral CD scale 242 shown in FIG. 5F may be presented to the pilot. While the aircraft was deviating from the first left navigation boundary to the right, the desired LCI 246 moved to the left and across the reference axis. Also, the first left DI 248 and second left DI 249 moved to the left and off the scale and were replaced with the first right DI 250 and the second right DI 251 moving to the left. Because the aircraft's location falls in between the first right navigation boundary 214 and the second right navigation boundary 218, the movement of the first right DI 250 and the second right DI 251 continued until the reference axis fell in between them, such that the distance between the reference axis and either the first right DI 250 and/or the second right DI 251 is proportional to the distance between the aircraft and either the first right navigation boundary 214 and/or the second right navigation boundary 218, respectively.

Additional advantages and benefits of the embodiments disclosed herein may be illustrated in the drawings of FIG. 6 by showing examples of how the vertical CD scale 244 of FIG. 4B responds to aircraft deviations within navigation boundaries of a desired lateral course. For the purpose of illustration and not of limitation, the desired vertical course and the navigation boundaries shown in FIG. 3B will be used in the drawings of FIG. 6.

Figure 6B:
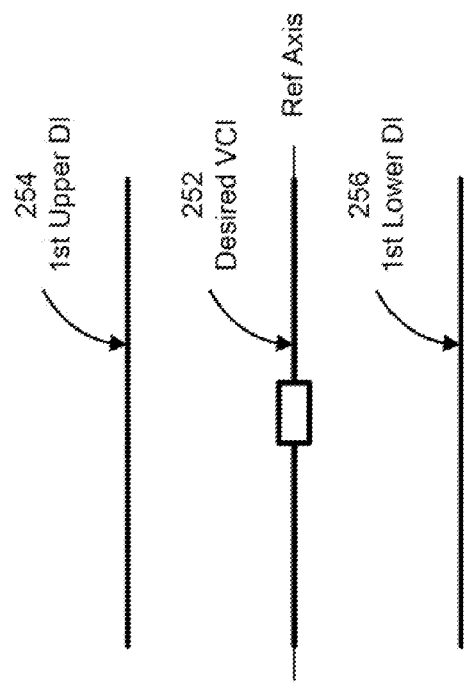
FIG. 6B provides an exemplary indication of a vertical CD scale for the aircraft of FIG. 6A.
Figure 6A:
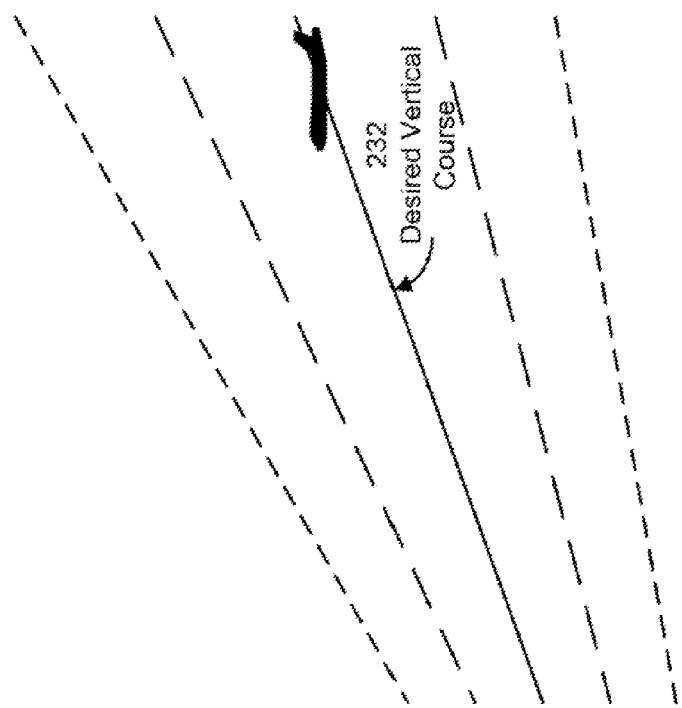
FIG. 6A provides an exemplary illustration of an aircraft located on a desired vertical course.
Figure 6D:
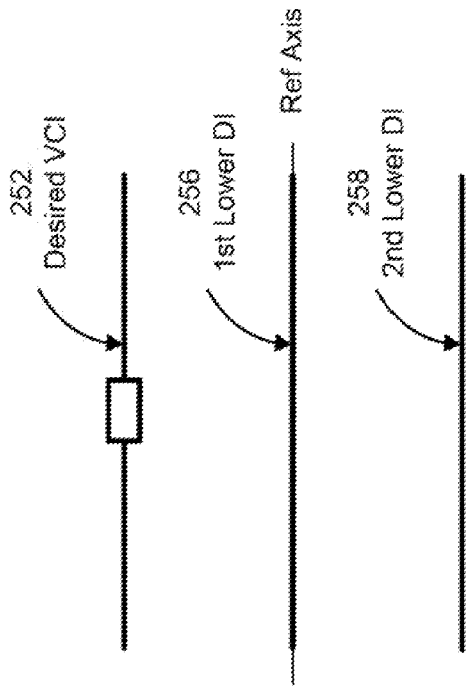
FIG. 6D provides an exemplary indication of a vertical CD scale for the aircraft of FIG. 6C.

Referring to FIG. 6A, an aircraft is located on the desired vertical course 232. In response to this information, the vertical CD scale 244 shown in FIG. 6B may be presented to the pilot. Here, the desired VCI 252 coincides with a reference axis to indicate no vertical course deviation, where such reference axis is representative of a stationary vertical reference. As embodied herein, the stationary vertical reference (which need not be an axis) could be configured so that it coincides with the vertical center of the aircraft attitude reference symbology when both are presented in an image on the display unit; the stationary vertical reference, however, need not be visible to the pilot.

Figure 6C:
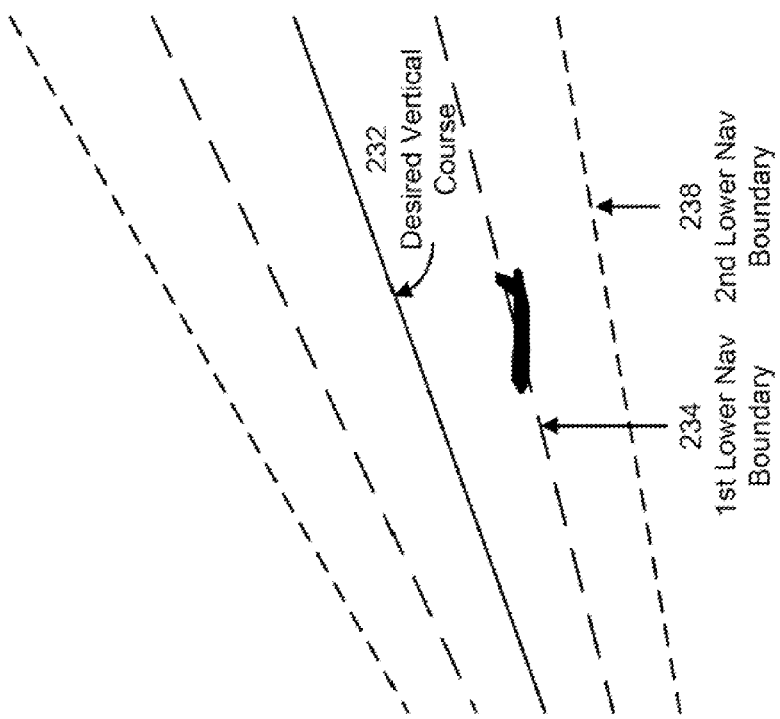
FIG. 6C provides an exemplary illustration of an aircraft located below a desired vertical course.
Figure 6F:
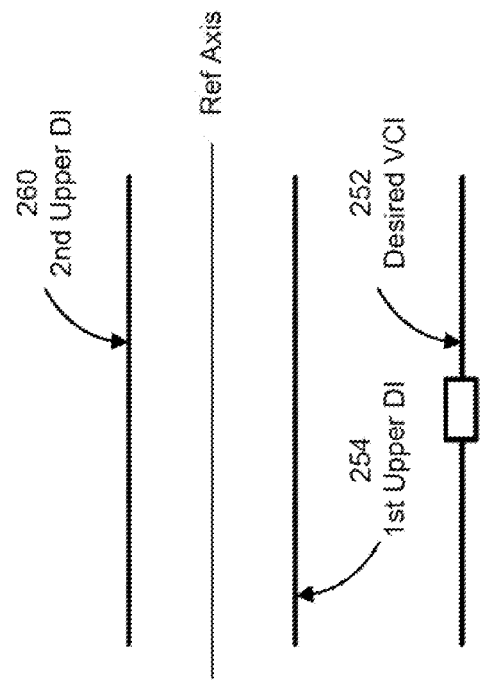
FIG. 6F provides an exemplary indication of a vertical CD scale for the aircraft of FIG. 6E.

Referring to FIG. 6C, assume that the aircraft shown in FIG. 6A has deviated below of the desired vertical course 232 and is now located on the first lower navigation boundary 234. In response to this information, the vertical CD scale 244 shown in FIG. 6D may be presented to the pilot. While the aircraft was deviating downward from the desired vertical course 232, the desired VCI 252 moved off the reference axis and downward. Also, the first lower DI 256 moved upward and now coincides with the reference axis because the aircraft's location coincides with the first lower navigation boundary 234. Also, the first upper DI 254 moved "off of the scale" and was replaced with a second lower DI 258 corresponding to the second lower navigation boundary 238.

Figure 6E:
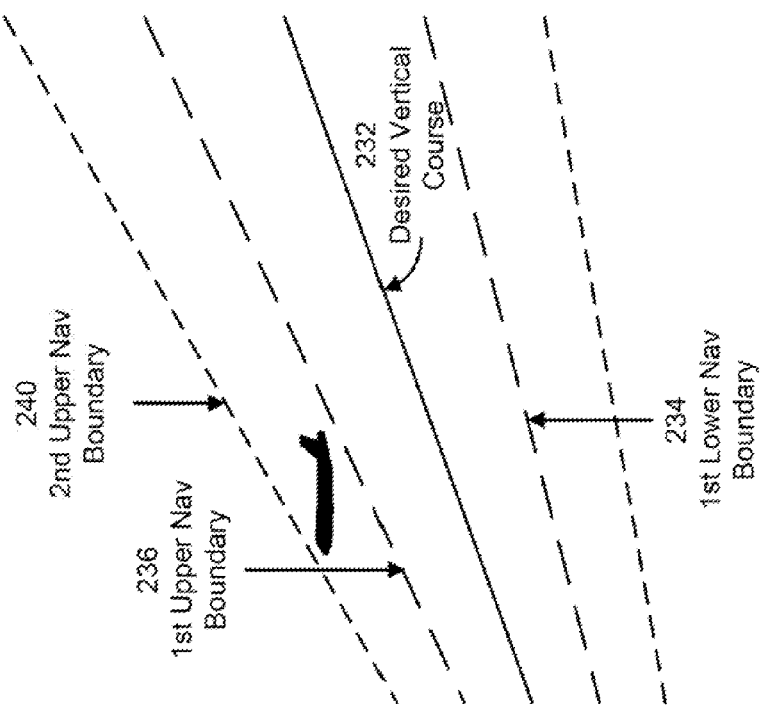
FIG. 6E provides an exemplary illustration of an aircraft located above a desired vertical course.

Referring to FIG. 6E, assume that the aircraft shown in FIG. 6C has deviated upward from the first lower navigation boundary 234 and the desired vertical course 232 and is now located between the first upper navigation boundary 236 and the second upper navigation boundary 240. In response to this information, the vertical CD scale 244 shown in FIG. 6F may be presented to the pilot. While the aircraft was deviating upward from the first lower navigation boundary, the desired VCI 252 moved to the downward and across the reference axis. Also, the first lower DI 256 and second lower DI 258 moved downward and off the scale and were replaced with the first upper DI 254 and the second upper DI 260 moving downward. Because the aircraft's location falls in between the first upper navigation boundary 236 and the second upper navigation boundary 240, the movement of the first upper DI 254 and the second upper DI 260 continued until the reference axis fell in between them, such that the distance between the reference axis and either the first upper DI 254 and/or the second upper DI 260 is proportional to the distance between the aircraft and either the first upper navigation boundary 236 and/or the second upper navigation boundary 240, respectively.

As stated above, the VOR system 140 may be a source of information from which deviation may be derived. Those skilled in the art understand that deviation from a desired course may be determined as a function of desired course information and VOR omnibearing information using known algorithms.

Figure 7A:
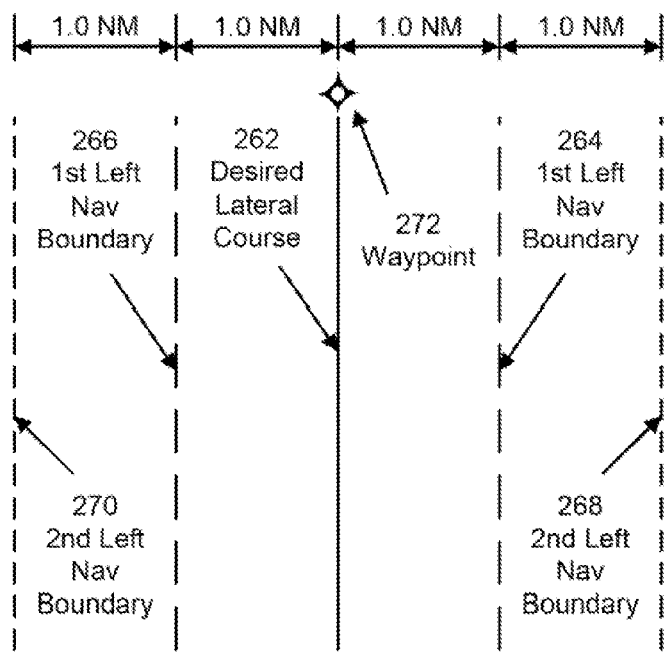
FIG. 7A provides an exemplary illustration of parallel, lateral boundaries.

In the previous examples, the navigation boundaries about the desired course have been convergent. The embodiments disclosed herein, however, are not limited to such boundaries. The SG 150 may establish parallel lateral and/or vertical boundaries. As illustrated in the drawings of FIG. 7, a manufacturer and/or end-user has established parallel boundaries about a desired lateral course. As shown in FIG. 7A, location information of the waypoint 272 and the desired lateral course 262 have been used in establishing evenly-spaced, parallel boundaries 264, 266, 268, and 270 about the desired lateral course 262.

Figure 7B:
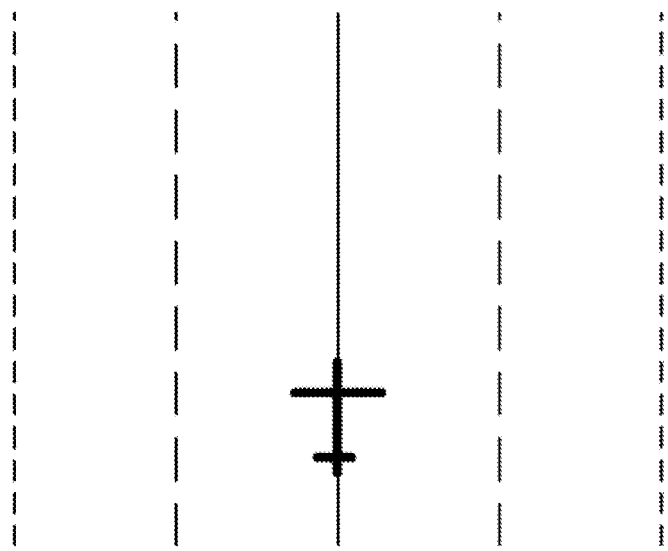
FIG. 7B provides an exemplary illustration of an aircraft located on a desired lateral course.

Referring to FIG. 7B, an aircraft is located on the desired lateral course 262. Here, there is no deviation because the desired lateral course 262 and the course to the waypoint 272 equal each other. In response to this information, the lateral CD scale 242 shown above in FIG. 5B may be presented to the pilot.

Figure 7C:
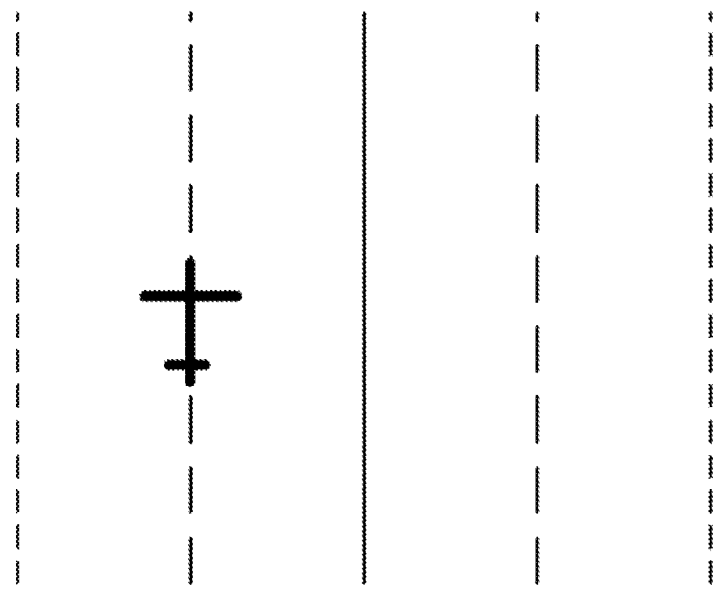
FIG. 7C provides an exemplary illustration of an aircraft located to the left of a desired lateral course.

Referring to FIG. 7C, assume that the aircraft shown in FIG. 7B has deviated left of the desired lateral course 262 and is now is located on the first left navigation boundary 266. In one embodiment, deviation may be derived as a function of the angular difference between desired lateral course 262 and the course to the waypoint 272. Those skilled in the art understand that the course to the waypoint 272 may be determined using location information of the waypoint and aircraft. In another embodiment, deviation may be determined as a product of the distance (between the waypoint location and aircraft location) and a sine function of the angular difference (between desired lateral course and the course to the waypoint). Those skilled in the art understand that the distance and course to the waypoint 272 may be determined using location information of the waypoint and aircraft. In response to this derivation, the lateral CD scale 242 shown in FIG. 5D may be presented to the pilot.

Figure 7D:
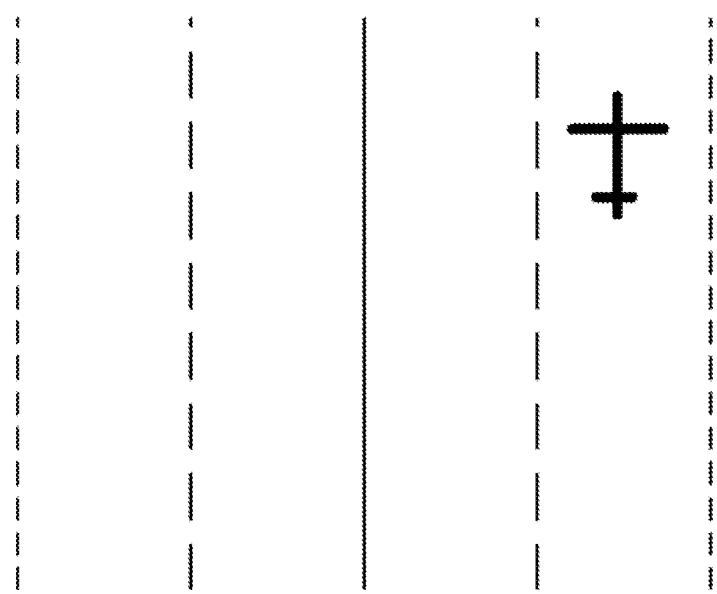
FIG. 7D provides an exemplary illustration of an aircraft located to the right of a desired lateral course.

Referring to FIG. 7D, assume that the aircraft shown in FIG. 7C has deviated right from the first left navigation boundary and the desired lateral course 212 and is now is located between the first right navigation boundary 214 and the second right navigation boundary 218. Using the location information of the waypoint and aircraft, deviation may be derived, and the lateral CD scale 242 shown in FIG. 5F may be presented to the pilot.

Figure 8A:
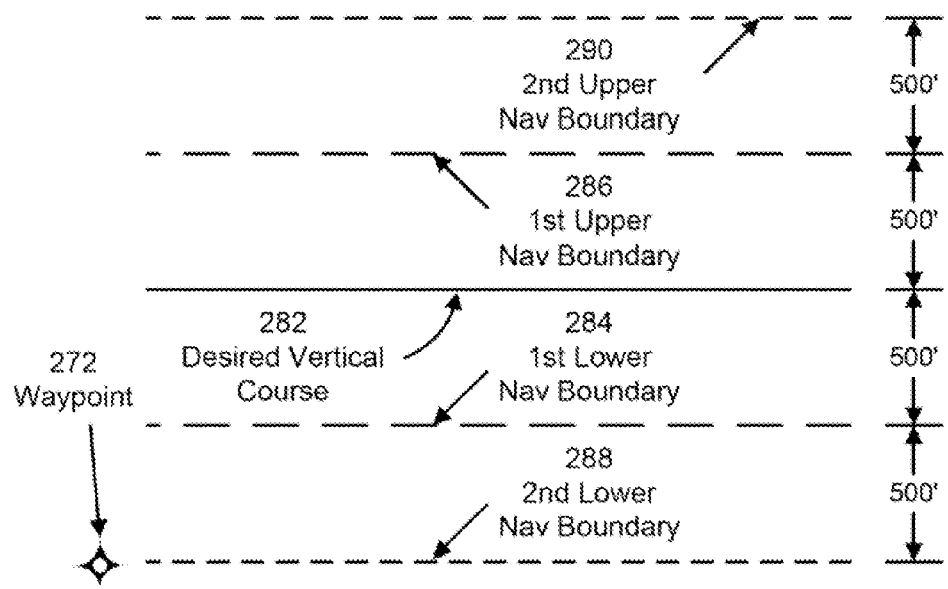
FIG. 8A provides an exemplary illustration of parallel, vertical boundaries.

As illustrated in the drawings of FIG. 8, a manufacturer and/or end-user has established parallel boundaries about desired vertical course; although the vertical course is shown as level, the techniques discussed herein may be applied to a climbing and/or descending desired vertical course(s). As shown in FIG. 8A, location information of the waypoint 272 and the desired vertical course 282 terminating at the waypoint 272 have been used in establishing evenly-spaced, parallel boundaries 284, 286, 288, and 290 about the desired vertical course 282.

Figure 8B:
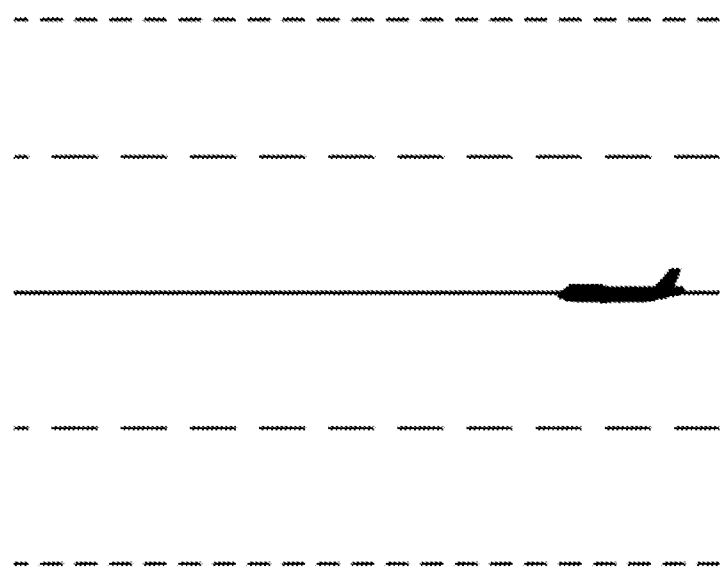
FIG. 8B provides an exemplary illustration of an aircraft located on a desired vertical course.

Referring to FIG. 8B, the altitude of the aircraft is located at the altitude of the desired vertical course 282. Here, there is no deviation because they equal each other. In response to this information, the vertical CD scale 242 shown above in FIG. 6B may be presented to the pilot.

Figures 8C, 8D:
FIG. 8C provides an exemplary illustration of an aircraft located below a desired vertical course.
FIG. 8D provides an exemplary illustration of an aircraft located above a desired vertical course.

Referring to FIG. 8C, assume that the aircraft shown in FIG. 8B has deviated from the desired vertical course 282 to a point where the difference between the altitude of the aircraft and the altitude of the desired vertical course 282 is 500 feet. Because the distance of 500 feet has been used to establish the first lower navigation boundary 284, the vertical CD scale 242 shown in FIG. 6D may be presented to the pilot.

Referring to FIG. 8D, assume that the aircraft shown in FIG. 8C has deviated above from the first lower navigation boundary and the desired vertical course 282 to a point where the difference between the altitude of the aircraft and the altitude of the desired vertical course 282 is 750 feet. Because the distance of 500 feet has been used to establish the first upper navigation boundary 286 and the distance of 1,000 feet has been used to establish the second upper navigation boundary 290, the vertical CD scale 242 shown in FIG. 6F may be presented to the pilot.

Figure 9:
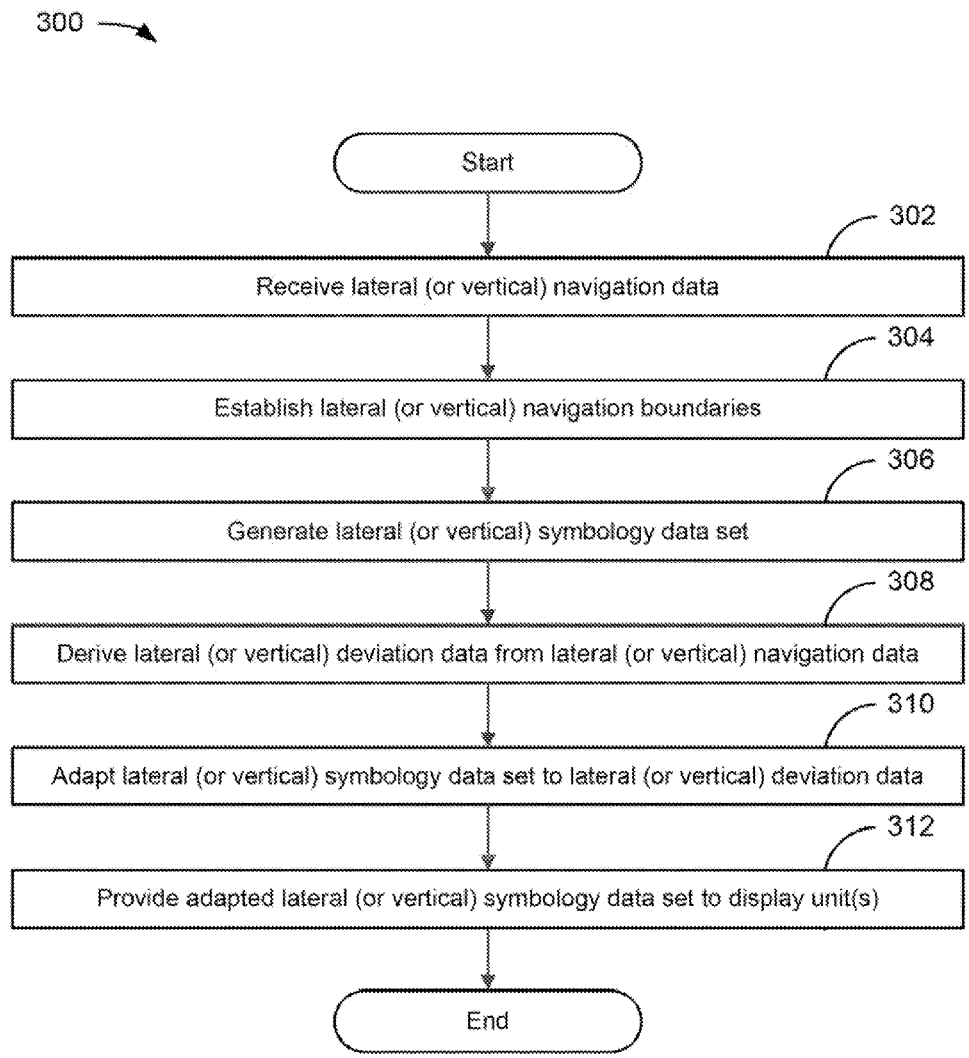
FIG. 9 depicts a flowchart of a method for presenting course deviation information on an aircraft display unit.

FIG. 9 depicts flowchart 300 disclosing an example of a method for presenting CD information on an aircraft display unit, where the SG 150 may be programmed or configured with instructions corresponding to the following modules embodied in the flowchart. As embodied herein, the SG 150 may be one processor or a combination of processors found in the navigation system 120, the ILS system 130, the VOR system 140, and/or the display unit 160. Also, the SG 150 may be a processor of a module such as, but not limited to, a printed circuit card having one or more input interfaces to facilitate the two-way data communications of the SG 150, i.e., the receiving and providing of data. As necessary for the accomplishment of the following modules embodied in the flowchart, the receiving of data is synonymous and/or interchangeable with the retrieving of data, and the providing of data is synonymous and/or interchangeable with the making available or supplying of data.

As shown in FIG. 9, the flowchart 300 is depicted. It should be noted that although the discussion of the following modules will be drawn to lateral CD, the modules apply separately to vertical CD. The flowchart begins with module 302 with the receiving of lateral navigation data that may be provided by the navigation system 110. In one embodiment, lateral navigation data may be comprised of ILS system data provided by the ILS system 130. In another embodiment, navigation data may be comprised of VOR system data provided by the VOR system 140. In another embodiment, lateral navigation data may be comprised of navigation system data representative of a desired lateral course, a waypoint, and an aircraft location provided by the navigation system 120.

The flowchart continues with module 304 with the establishing of a plurality of navigation boundaries about a desired lateral course. Navigation boundaries may be configured by a manufacturer and/or end-user in a plurality options. Navigation boundaries may be configured as angular measurements from a waypoint or linear measurements from the waypoint in a direction that is perpendicular to the desired course.

In an embodiment in which the ILS system 130 has provided the navigation data, the dot indications corresponding to the ILS could be used as a basis for establishing navigation boundaries. For example, first left and right navigation boundaries could be established as left and right deviations of 1.25 degrees about the desired course, respectively; and/or second left and right navigation boundaries could be established as left and right deviations of 2.50 degrees about the desired course, respectively.

Similarly, in an embodiment in which the VOR system 140 has provided the navigation data, the dot indications corresponding to the VOR could also be used as a basis for establishing navigation boundaries. For example, first left and right navigation boundaries could be established as deviations of 2.0 degrees on each side of the selected course, second left and right navigation boundaries could be established as deviations of 4.0 degrees on each side of the selected course, and so on. It should be noted that information about the selected course may be found in the VOR system data.

In an embodiment in which the navigation system 120 has provided the navigation data, a waypoint along a flight plan could be used as a basis for establishing navigation boundaries. If the waypoint is a runway threshold or a VOR, the manufacturer and/or end-user may elect to establish the boundaries corresponding to an ILS and/or VOR.

The flowchart continues with module 306 with the generating of a lateral symbology data set, where such symbology data set may be representative of a lateral CD scale. The lateral CD scale could be comprised of the desired LCI and at least one lateral DI. It should be noted that, although a plurality of lateral DIs were discussed above, one lateral DI only may be used to present CD to the pilot. The desired LCI could correspond to the desired lateral course, and each lateral DI could correspond to a single lateral navigation boundary.

The flowchart continues with module 308 with the deriving of lateral deviation data from the navigation data, where such lateral deviation data may be representative of lateral CD. In an embodiment in which the navigation data is comprised of ILS system data, localizer deviation information found in the ILS system data may be obtained and used as lateral CD; it should be noted that glide slope deviation provided in the ILS system data may be obtained and used as vertical CD information.

In an embodiment in which the navigation data is comprised of VOR system data, selected course (e.g., an OBS value) and VOR omnibearing found in the VOR system data may be used to determine lateral CD as a function of the difference between the selected course and the VOR omnibearing.

In an embodiment in which the navigation system 120 has provided the navigation data, lateral CD may be determined from desired course, waypoint location, and aircraft location found in the FMS data. In one embodiment, deviation may be determined as a function of the angular difference between desired lateral course and the course to the waypoint, where the course to the waypoint may be determined from the waypoint location and aircraft location. In another embodiment, deviation may be determined as a product of the distance (between the waypoint location and aircraft location) and a sine function of the angular difference (between desired lateral course and the course to the waypoint).

The flowchart continues with module 310 with the adapting of the lateral deviation symbology data set to the lateral deviation data. As stated above, the desired LCI could correspond to the desired lateral course and each lateral DI could correspond to a single lateral navigation boundary. The distance between the desired LCI and each lateral DI (which may subsequently subjected to a scaling function so that the lateral CD scale is converted to the appropriate screen size) may be established as a proportionality between the desired lateral course and each respective lateral navigation boundary. Also, a stationary lateral reference may be established by the SG 140.

If the lateral CD indicates no deviation from the desired lateral course, the SG 140 may be programmed to place the desired LCI so that it coincides with the stationary lateral reference and each lateral DI so that each coincides with its respective lateral navigation boundary. If the lateral CD information indicates lateral deviation from the desired lateral course, the SG 140 may be programmed to respond to such lateral deviation by placing the desired LCI so that it does not coincide with the stationary lateral reference, where the lateral distance between the desired LCI and the stationary lateral reference is proportional to the deviation from the desired lateral course. If the distance between the desired LCI and each lateral DI remains constant, then each lateral DI may be placed so that such distance is maintained. During the time in which a change in deviation occurs, the desired LCI and each lateral DI could appear move together in unison with one another in response to the change when presented as symbology on the screen of the display unit.

The method continues with module 312 with the providing of the adapted lateral deviation symbology data set to one or more display units. When received by the display unit, the symbology of the lateral CD scale may be presented to the pilot on the screen of the display unit. The desired first DI and each first DI could appear as moving in unison within the lateral first CD scale in response to changes in the lateral CD. As embodied herein, the symbology may be superimposed (i.e., overlaid) on top of an image of an electronic flight indicator and/or three-dimensional synthetic perspective scene outside the aircraft. Additionally, symbology may be placed so that it is centered on the aircraft attitude reference symbology. Moreover, the stationary lateral reference may be placed to coincide with the lateral center of the aircraft attitude reference symbology. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for presenting course deviation information on an aircraft display unit, such system comprising:
   at least one source of navigation data;
   a symbology generator configured to
      receive first navigation data,
      establish a plurality of first desired course navigation boundaries based upon the first navigation data,
      generate a first deviation symbology data set representative of a first course deviation scale, where
         such first course deviation scale is comprised of a desired first course indicator and at least one first deviation indicator, where
            the desired first course indicator corresponds to a desired first course and each first deviation indicator corresponds to one first desired course navigation boundary,
      derive first deviation data from the first navigation data, where
         such first deviation data is representative of first course deviation,
      adapt the first deviation symbology data set to the first deviation data, such that the placement of the desired first course indicator and each first deviation indicator is based upon the first course deviation, and
      provide the adapted first deviation symbology data set representative of an adapted first course deviation scale to a display unit; and
   the display unit configured to
      receive the adapted first deviation symbology data set, and
      present an image represented in the adapted first deviation symbology data set on a screen of the display unit, whereby
         symbology of the adapted first course deviation scale is presented, and the desired first course indicator and each first deviation indicator move together in unison in response to changes in the first course deviation.

2. The system of claim 1, wherein
one source of navigation data is an instrument landing system ("ILS") system,
the first navigation data is ILS system data, and
the first course deviation is derived from a localizer deviation found in the ILS system data.

3. The system of claim 1, wherein
one source of navigation data is a VHF omnidirectional range ("VOR") system,
the first navigation data is VOR system data, and
the first course deviation is derived from a selected course and a VOR omnibearing found in the VOR system data.

4. The system of claim 1, wherein
one source of navigation data is a navigation system,
the first navigation data is representative of
the desired first course,
a waypoint location of a waypoint, and
an aircraft location, and
the first course deviation is derived as either
a function of an angular difference between the desired first course and a course to the waypoint, where such course to the waypoint is determined from the waypoint location and the aircraft location, or
a product of a distance between the waypoint location and the aircraft location and a sine function of the angular difference.

5. The system of claim 1, wherein
the display unit is further configured to
display aircraft attitude reference symbology against a background of an image of either a two-dimensional electronic flight indicator or a three-dimensional perspective of the scene outside the aircraft, such that
the adapted first course deviation scale is centered on the aircraft attitude reference symbology.

6. The system of claim 1, wherein
the symbology generator is further configured to
receive second navigation data,
establish a plurality of second desired course navigation boundaries based upon the second navigation data,
generate a second deviation symbology data set representative of a second course deviation scale, where
such second course deviation scale is comprised of a desired second course indicator and at least one second deviation indicator, where
the desired second course indicator corresponds to a desired second course and each second deviation indicator corresponds to one second desired course navigation boundary,
derive second deviation data from the second navigation data, where
such second deviation data is representative of second course deviation,
adapt the second deviation symbology data set to the second deviation data, such that
the placement of the desired second course indicator and each second deviation indicator is based upon the second course deviation, and
provide the adapted second deviation symbology data set representative of an adapted second course deviation scale to the display unit; and
the display unit is further configured to
receive the adapted second deviation symbology data set, and
present an image represented in the adapted second deviation symbology data set on the screen of the display unit, whereby
symbology of the adapted second course deviation is presented, and
the desired second course indicator and each second deviation indicator move together in unison in response to changes in the first course deviation.

7. The system of claim 6, wherein
one source of navigation data is an instrument landing system ("ILS") system,
the second navigation data is ILS system data, and
the second course deviation is derived from a glide slope deviation found in the ILS system data.

8. The system of claim 6, wherein
one source of navigation data is a navigation system,
the second navigation data is representative of
the desired second course,
a waypoint location of a waypoint, and
an aircraft location, and
the second course deviation is derived as either
a function of an angular difference between the desired second course and a course to the waypoint, where such course to the waypoint is determined from the waypoint location and the aircraft location, or
a product of a distance between the waypoint location and the aircraft location and a sine function of the angular difference.

9. The system of claim 6, wherein
the display unit is further configured to
display aircraft attitude reference symbology against a background of an image of either a two-dimensional electronic flight indicator or a three-dimensional synthetic perspective of the scene outside the aircraft, such that
the adapted second course deviation scale is centered on the aircraft attitude reference symbology.

10. A device for presenting course deviation information on an aircraft display unit, such device comprising:
a symbology generator configured to
receive first navigation data;
establish a plurality of first desired course navigation boundaries based upon the first navigation data;
generate a first deviation symbology data set representative of a first course deviation scale, where
such first course deviation scale is comprised of a desired first course indicator and at least one first deviation indicator, where
the desired first course indicator corresponds to a desired first course and each first deviation indicator corresponds to one first desired course navigation boundary;
derive first deviation data from the first navigation data, where
such first deviation data is representative of first course deviation;
adapt the first deviation symbology data set to the first deviation data, such that
the placement of the desired first course indicator and each first deviation indicator is based upon the first course deviation; and
provide the adapted first deviation symbology data set representative of an adapted first course deviation scale to a display unit, whereby
symbology of the adapted first course deviation scale is presented on a screen of the display unit, and the desired first course indicator and each first deviation indicator move together in unison in response to changes in the first course deviation.

11. The device of claim 10, wherein
the first navigation data is instrument landing system ("ILS") system data, and
the first course deviation is derived from a localizer deviation found in the ILS system data.

12. The device of claim 10, wherein
the first navigation data is a VHF omnidirectional range ("VOR") system data, and
the first course deviation is derived from a selected course and a VOR omnibearing found in the VOR system data.

13. The device of claim 10, wherein
the first navigation data is representative of
the desired first course,
a waypoint location of a waypoint, and
an aircraft location, and
the first course deviation is derived as either
a function of an angular difference between the desired first course and a course to the waypoint, where
such course to the waypoint is determined from the waypoint location and the aircraft location, or
a product of a distance between the waypoint location and the aircraft location and a sine function of the angular difference.

14. The device of claim 10, wherein
the symbology generator is further configured to
receive second navigation data;
establish a plurality of second desired course navigation boundaries based upon the second navigation data;
generate a second deviation symbology data set representative of a second course deviation scale, where
such second course deviation scale is comprised of a desired second course indicator and at least one second deviation indicator, where
the desired second course indicator corresponds to a desired second course and each second deviation indicator corresponds to one second desired course navigation boundary;
derive second deviation data from the second navigation data, where
such second deviation data is representative of second course deviation;
adapt the second deviation symbology data set to the second deviation data, such that
the placement of the desired second course indicator and each second deviation indicator is based upon the second course deviation; and
provide the adapted second deviation symbology data set representative of an adapted second course deviation scale to the display unit, whereby
symbology of the adapted second course deviation scale is presented on the screen of the display unit, and
the desired second course indicator and each second deviation indicator move together in unison in response to changes in the second course deviation.

15. The device of claim 14, wherein
the second navigation data is instrument landing system ("ILS") system data, and
the second course deviation is derived from a glide slope deviation found in the ILS system data.

16. The device of claim 14, wherein
the second navigation data is representative of
the desired second course,
a waypoint location of a waypoint, and
an aircraft location, and
the second course deviation is derived as either
a function of an angular difference between the desired second course and
a course to the waypoint, where
such course to the waypoint is determined from the waypoint location and the aircraft location, or
a product of a distance between the waypoint location and the aircraft location and a sine function of the angular difference.

17. A method for presenting course deviation information on an aircraft display unit, where such method is performed by a processor of an aircraft system, such method comprising:
receiving first navigation data from a navigation data source;
establishing a plurality of first desired course navigation boundaries based upon the first navigation data;
generating a first deviation symbology data set representative of a first course deviation scale, where
such first course deviation scale is comprised of a desired first course indicator and at least one first deviation indicator, where
the desired first course indicator corresponds to a desired first course and each first deviation indicator corresponds to one first desired course navigation boundary;
deriving first deviation data from the first navigation data, where
such first deviation data is representative of first course deviation;
adapting the first deviation symbology data set to the first deviation data, such that
the placement of the desired first course indicator and each first deviation indicator is based upon the first course deviation; and
providing the adapted first deviation symbology data set representative of an adapted first course deviation scale to a display unit, whereby
symbology of the adapted first course deviation scale is presented on a screen of the display unit, and
the desired first course indicator and each first deviation indicator move together in unison in response to changes in the first course deviation.

18. The method of claim 17, wherein
one navigation data source is an instrument landing system ("ILS") system,
the first navigation data is ILS system data, and
the first course deviation is derived from a localizer deviation found in the ILS system data.

19. The method of claim 17, wherein
one navigation data source is a a VHF omnidirectional range ("VOR") system,
the first navigation data is VOR system data, and
the first course deviation is derived from a selected course and a VOR omnibearing found in the VOR system data.

20. The method of claim 17, wherein
one navigation data source is a navigation system,
the first navigation data is representative of
the desired first course,
a waypoint location of a waypoint, and
an aircraft location, and
the first course deviation is derived as either
a function of an angular difference between the desired first course and a course to the waypoint, where
such course to the waypoint is determined from the waypoint location and the aircraft location, or a product of a distance between the waypoint location and the aircraft location and a sine function of the angular difference.

21. The method of claim 17, further comprising:

receiving second navigation data from a navigation data source;

establishing a plurality of second desired course navigation boundaries based upon the second navigation data;

generating a second deviation symbology data set representative of a second course deviation scale, where
such second course deviation scale is comprised of a desired second course indicator and at least one second deviation indicator, where
the desired second course indicator corresponds to a desired second course and each second deviation indicator corresponds to one second desired course navigation boundary;

deriving second deviation data from the second navigation data, where
such second deviation data is representative of second course deviation;

adapting the second deviation symbology data set to the second deviation data, such that
the placement of the desired second course indicator and each second deviation indicator is based upon the second course deviation; and providing the adapted second deviation symbology data set representative of an adapted second course deviation scale to the display unit, whereby symbology of the adapted second course deviation scale is presented on the screen of the display unit, and
the desired second course indicator and each second deviation indicator move together in unison in response to changes in the second course deviation.

22. The method of claim 21, wherein one source for providing navigation data is an instrument landing system ("ILS") system, the second navigation data is ILS system data, and the second course deviation is derived from a glide slope deviation found in the ILS system data.

23. The method of claim 21, wherein one navigation data source is a navigation system, the second navigation data is representative of
the desired second course,
a waypoint location of a waypoint, and
an aircraft location, and the second course deviation is derived as either
a function of an angular difference between the desired second course and a course to the waypoint, where
such course to the waypoint is determined from the waypoint location and the aircraft location, or
a product of a distance between the waypoint location and the aircraft location and a sine function of the angular difference.

* * * * *